United States Patent [19]

Johri

[11] Patent Number: 5,625,622
[45] Date of Patent: Apr. 29, 1997

[54] APPARATUS AND METHOD FOR A GENERALIZED LEAKY BUCKET

[75] Inventor: Pravin K. Johri, Aberdeen, N.J.

[73] Assignee: Lucent Technologies Inc., Murray Hill, N.J.

[21] Appl. No.: 579,526

[22] Filed: Dec. 27, 1995

[51] Int. Cl.$^6$ ................................................ H04J 3/14
[52] U.S. Cl. ............................................ 370/232; 370/395
[58] Field of Search ........................... 370/17, 60, 60.1, 370/94.1, 94.2

[56] References Cited

U.S. PATENT DOCUMENTS

| | | | |
|---|---|---|---|
| 5,280,470 | 1/1994 | Buhrke et al. | 370/13 |
| 5,339,332 | 8/1994 | Kammerl | 375/10 |
| 5,347,511 | 9/1994 | Gun | 370/54 |
| 5,359,593 | 10/1994 | Derby et al. | 370/17 |
| 5,442,624 | 8/1995 | Bonomi et al. | 370/17 |
| 5,497,375 | 3/1996 | Hluchyj et al. | 370/94.1 |
| 5,559,798 | 9/1996 | Clarkson et al. | 370/60.1 |

*Primary Examiner*—Douglas W. Olms
*Assistant Examiner*—Min Jung

[57] ABSTRACT

A generalized leaky bucket mechanism allowing multiple burst sizes and drain rates. The generalized leaky bucket includes multiple token pool sizes and drain rates, wherein the leaky bucket gradually steps up to larger token pool sizes and steps down as soon as user bursts utilize the increased number of tokens. This allows bursts of various sizes with frequencies which decrease with the burst size. Control of when to step up to higher burst sizes is accomplished through simple trigger conditions which operate to selectively increment the token pool count of the leaky bucket at these times.

23 Claims, 3 Drawing Sheets

APPARATUS AND METHOD FOR A GENERALIZED LEAKY BUCKET

FIELD OF THE INVENTION

The present invention relates generally to traffic management in packet communications networks, and more particularly to a generalized leaky bucket mechanism for policing ATM networks.

BACKGROUND OF THE INVENTION

Asynchronous Transfer Mode (ATM) technology is being developed to support multi-service high-speed communication networks. An important component of such a technology is a policing or usage parameter control mechanism to ensure that users stay within negotiated usage guidelines when communicating over the network. The leaky bucket is a well-known policing mechanism which is widely accepted due to its inherent simplicity.

The simplest version of a leaky bucket policing mechanism has two parameters—the drain rate d which corresponds roughly to the rate at which cells are let into the leaky bucket and the maximum token pool size b which generally represents the maximum number of cells that can be handled by the leaky bucket at a given time. A third parameter, the measurement interval T, is often specified but has no direct impact on the performance of the leaky bucket.

As would be understood by a person skilled in the art, the maximum burst size allowed by the leaky bucket is larger than the token pool size by an amount which depends on the token pool size, drain rate, access line rate and the peak cell removal rate. For practical purposes, however, this distinction will be ignored in the instant discussion. In general, the leaky bucket operates as follows: every 1/d time units the number of tokens is incremented by 1, up to the maximum limit b. When a cell arrives to be transmitted, and a token is available, the cell is accepted by the leaky bucket and the number of tokens is decremented by 1. If a token is not available, the cell is discarded—thus the name "leaky bucket".

An equivalent alternate description of the leaky bucket includes a counter which counts the number of cell arrivals instead of accumulated tokens. Whenever a cell arrives and the cell count is less than the limit b, the cell count is incremented by 1 and the cell is allowed in. If the cell count is b, the cell is discarded. Every $d^{-1}$ time units the cell count is decremented by 1.

There are various other generalizations of the leaky bucket mechanism found in the prior art. For example, the leaky bucket may contain a shaping buffer for incoming cells. Now, if a token is not immediately available, the cell is stored in the shaping buffer. The cell is then only discarded if the shaping buffer is full. Instead of being discarded, cells could also be tagged and let into the network at a lower priority or could be queued and other cells from the head of the queue tagged and let into the network.

Another type of leaky bucket mechanism found in the prior art is the adaptive leaky bucket. The adaptive leaky bucket discards cells only if no tokens are available and the measured load on the transmission link is above a prescribed threshold. Still another version of the leaky bucket mechanism, the jumping leaky bucket, works over short fixed time intervals called windows. The token counter is incremented by a fixed amount of tokens and decremented by the number of cells which arrived in the previous window. In addition, a leaky bucket with memory may accumulate information about discarded cells by letting the token counter dip below zero.

As mentioned, a main advantage of the leaky bucket is that it is relatively easy to implement. The leaky bucket, however, also has some significant disadvantages, a first being that the leaky bucket control mechanism may not be adequate for the typical bursty behavior of users in an ATM network. In addition, it is usually difficult to directly relate parameters of a leaky bucket to user traffic characteristics. That is, the two leaky bucket parameters, b and d, allow a wide range of user behavior and the network has no way of knowing how a user will behave. In order to protect itself and other users, the network may need to assume the worst case behavior allowed by the traffic parameters.

For example, it is traditionally believed that the nearly-worst case behavior for the traffic parameters in the leaky bucket is: ON-OFF with the ON period generating b cells at the access line speed every $bd^{-1}$ time units. The ON-OFF behavior, however, is not always the worst case behavior as has been shown. In fact, assuming the worst case behavior can be quite conservative. For instance, the single limit b on the token pool size means that b must correspond to the largest burst size to be allowed in and, consequently, the leaky bucket can be overdimensioned.

One motivation for considering enhancements to the leaky bucket mechanism, as can be seen above, is that the single limit on the token pool size is too confining. For example, consider an illustration of network usage, where a user wants one in four bursts to be up to 400 cells and the other three bursts to be less than 200 cells.

A leaky bucket mechanism of the prior art cannot take advantage of the usage pattern described above. Since the single token pool size b must be set according to the largest burst size, the resulting leaky bucket may allow much more bursty traffic than the traffic offered by the user. If the network charges according to the worst case behavior allowed by the leaky bucket the user may be overcharged. If not, the network is susceptible to users who contract for a smaller rate but then take full advantage of the excess allowed by the leaky bucket. Accordingly, in order to better ensure that users stay within negotiated traffic guidelines of a communications network contract, there is a strong need for a policing mechanism which allows a distribution of burst sizes but still retains the simplicity of the leaky bucket mechanism.

SUMMARY OF THE INVENTION

The present invention discloses a novel method and apparatus for implementation of a leaky bucket allowing multiple burst sizes and drain rates. The present invention, generalized leaky bucket, includes multiple token pool sizes and drain rates allowing the leaky bucket mechanism to gradually step up to larger token pool sizes and step down as soon as user bursts utilize the increased number of tokens. This enables bursts of various sizes with frequencies which decrease with the burst size. Control of when to step up to higher burst sizes is accomplished through simple trigger conditions which also operate to selectively increment the token pool count of the leaky bucket when the trigger conditions are present.

One preferred embodiment of the present invention leaky bucket includes a token counter for tracking the number of tokens presently available at the leaky bucket and a controller for controlling access of cells to the leaky bucket, wherein a cell is accepted into the leaky bucket for transmission as long as tokens are available in the token counter.

A parameter selector is also included for selecting an active parameter set from a group of multiple parameter sets which include varying drain rates and token pools sizes to accommodate varying bursts of cells entering the controller. A single parameter set includes at least a drain rate and token pool size parameter, and the parameter selector is operable to alter the active parameter set in accordance with predefined trigger conditions. A token regenerator replenishes the tokens in the token counter at prespecified intervals and the parameter selector selects an active parameter set according to a predetermined time interval $\tau$.

BRIEF DESCRIPTION OF THE FIGURES

For a better understanding of the present invention, reference may be had to the following description of exemplary embodiments thereof, considered in conjunction with the accompanying drawings, in which.

DETAILED DESCRIPTION

Figure 1:
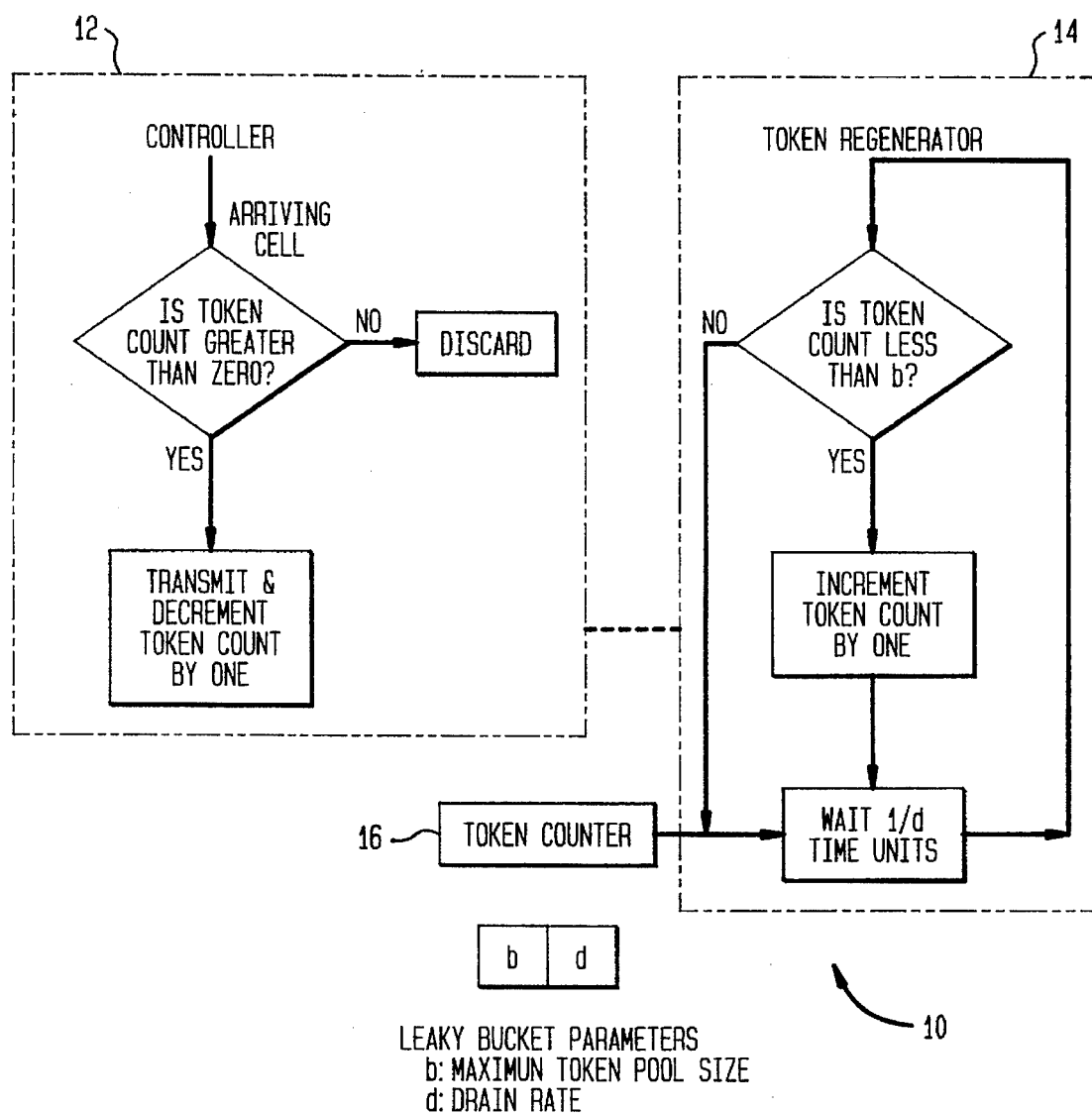
FIG. 1 shows a block diagram for operation of a standard leaky bucket mechanism.

The present invention discloses a novel method and apparatus for implementation of a leaky bucket allowing multiple burst sizes and drain rates. Referring to FIG. 1, there is shown an exemplary embodiment of a standard leaky bucket mechanism 10. As shown, the leaky bucket mechanism includes a controller 12, a token regenerator 14 and a token counter 16. These components operate in conjunction with two well-known parameters—the maximum token pool size b and the drain rate d. As can be seen, every 1/d time units the token regenerator 14 increments the number of tokens in the token counter 16 by 1, up to a maximum limit of b. When a cell arrives to be transmitted at the controller 12 of the leaky bucket 10 the controller checks whether the token count in the token counter 16 is greater than zero. If a token is available, i.e., the token count is greater than zero, the cell is accepted and the number of tokens is decremented by 1. If a token is not available, the cell is discarded.

The present invention improves upon the network policing capabilities of the standard leaky bucket mechanism 10 by allowing multiple token pool sizes and drain rates in order to accommodate multiple burst sizes. Consider again, the exemplary illustration of network usage discussed in the background. A specific user wants one in four bursts to be up to 400 cells and the other three bursts to be less than 200 cells. However, the traditional leaky bucket is unable to accommodate these multiple burst sizes. This example shows the need for a mechanism which allows two burst sizes—200 and 400. In accordance with one exemplary embodiment of the present invention, the improved leaky bucket starts with a first token pool size of 200 and increases it to a second token pool size of 400 after some time. In order to let in a larger burst, the token pool count is then optionally incremented by 200 when the token pool size is increased. Once a large burst arrives and the token count drops below 200, the token pool size will be reduced to 200 and the procedure repeated. As can be understood, when the token pool size is 400, the leaky bucket of the present invention allows a bigger burst. At this time it may then be desirable to balance this increase by reducing the drain rate. Thus, one can think of the present invention leaky bucket as having two token pool sizes and two corresponding drain rates. The advantage of having two token pool sizes and two drain rates is that the leaky bucket can now accommodate the varying burst sizes. This idea is generalized in the following discussion to include multiple token pool sizes and corresponding drain rates.

Generalized Leaky Bucket

Figure 2:
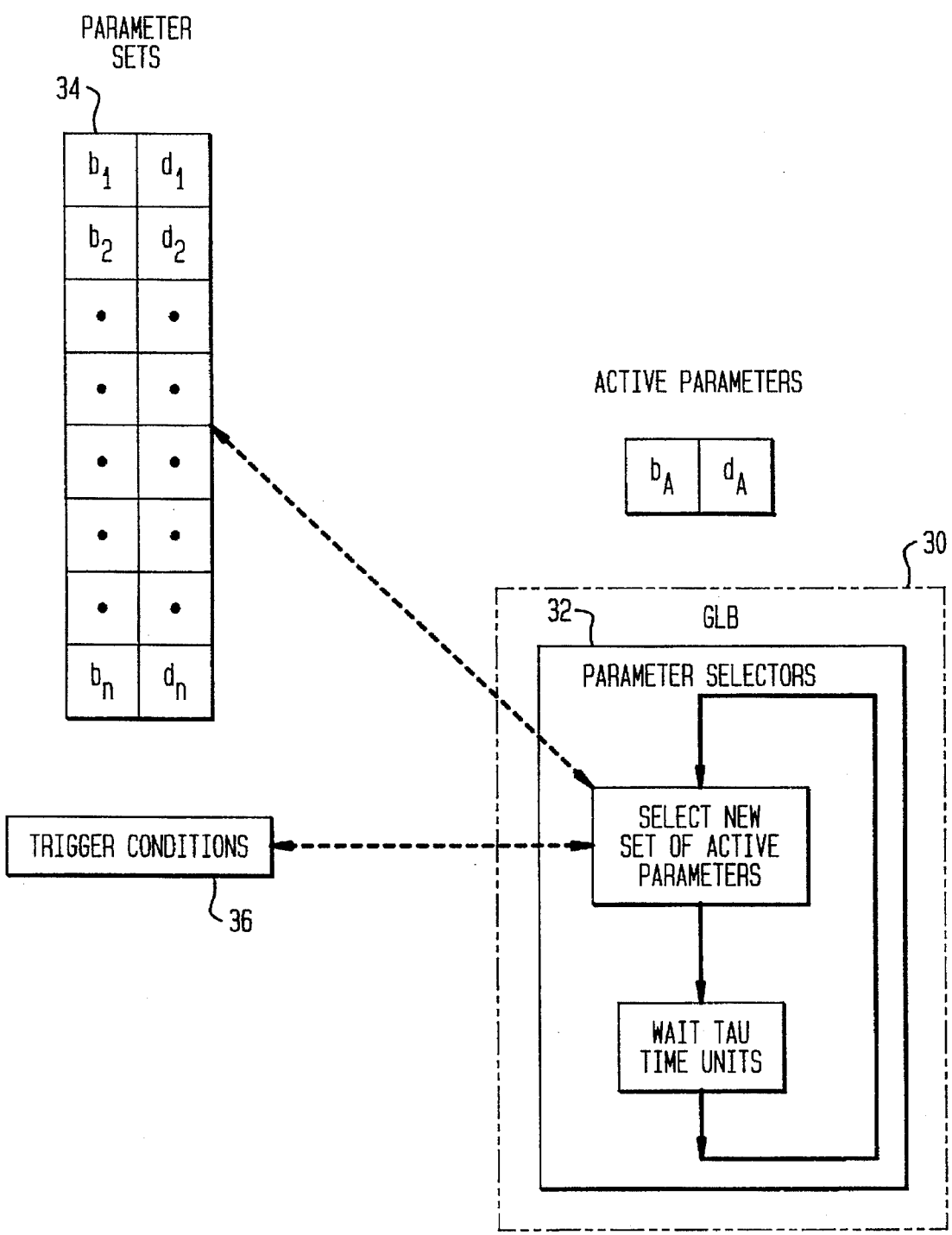
FIG. 2 shows a block diagram illustrating selection of active parameter sets in accordance with the present invention.

A main idea behind the present invention generalized leaky bucket is to gradually step up to larger token pool sizes and step down as soon as user bursts utilize the increased number of tokens. This will allow bursts of various sizes with frequencies which decrease with the burst size. Referring to FIG. 2, there is shown one preferred embodiment of a parameter selector 32 used in connection with the present invention generalized leaky bucket mechanism 30. The generalized leaky bucket mechanism 30 in effect combines the parameter selector 32 of FIG. 2 with the operation of a traditional leaky bucket.

In describing the generalized leaky bucket 30, let n be the number of parameter sets 34, i.e., drain rate and maximum token pool size pairs allowed by the generalized leaky bucket 30 (GLB) and $d_i$ and $b_i$ denote the i-th drain rate and i-th (maximum) token pool size, respectively. Without loss of generality, it is assumed that the token pool sizes are increasing in i. While the generalized leaky bucket design will allow nondecreasing token pool sizes, having two equal token pool sizes would understandably not make practical sense. It is desirable, but not necessary, that the drain rates be nonincreasing in i.

The generalized leaky bucket 30 of the present invention is said to be in state i if currently the i-th drain rate and i-th token pool size from the n parameter sets 34 are active. As shown in FIG. 2, the state of the generalized leaky bucket 30 is recorded and possibly changed every $\tau$ time units by means of the parameter selector 32, wherein the last m states are stored in a state vector $v=(v_1, v_2, \ldots, v_m)$ (not shown). The choice of $\tau$ depends on the rate of incoming bursts. This is similar in concept to the measurement interval T as discussed with respect to the original leaky bucket. The mechanism for changing the state i of the generalized leaky bucket is to observe the token pool count r (from the token pool counter shown in FIG. 1) every $\tau$ time units. The token pool is said to be in state s if $b_{s-1} < r \leq b_s$ with $b_0$ defined as 0.

As discussed, a main task of the generalized leaky bucket 30 is to gradually step up to larger token pool sizes and step down as soon as user bursts utilize the increased number of tokens. As can be understood, this allows bursts of various sizes with varying frequencies. The time to step up to the larger token pool sizes can be specified in multiples of $\tau$ with a simple mechanism denoted as a trigger condition mechanism 36. Let $t_i$ denote the trigger condition in the i-th state, where $i=1,2,\ldots,n-1$. The $t_i$ are constrained to be positive integers no larger than m. With the current state of the token pool being s, if the most recent $t_s$ values of the state vector v are also equal to s, then the state of the generalized leaky bucket 30 is set or stepped up to the next token pool size s+1. Otherwise, the generalized leaky bucket is set to or remains at s. Hence, the generalized leaky bucket 30 of the present invention must stay in state s for (at least) $t_s \times \tau$ time units before it steps up to state s+1. Stepping down to a lower token pool size depends simply on how fast the tokens are used up. The parameter selector 32 of the present invention leaky bucket mechanism is thus constantly looping, wherein a new set of active parameters 34 are selected every $\tau$ time units depending on the state of the trigger conditions 36.

Figure 3:
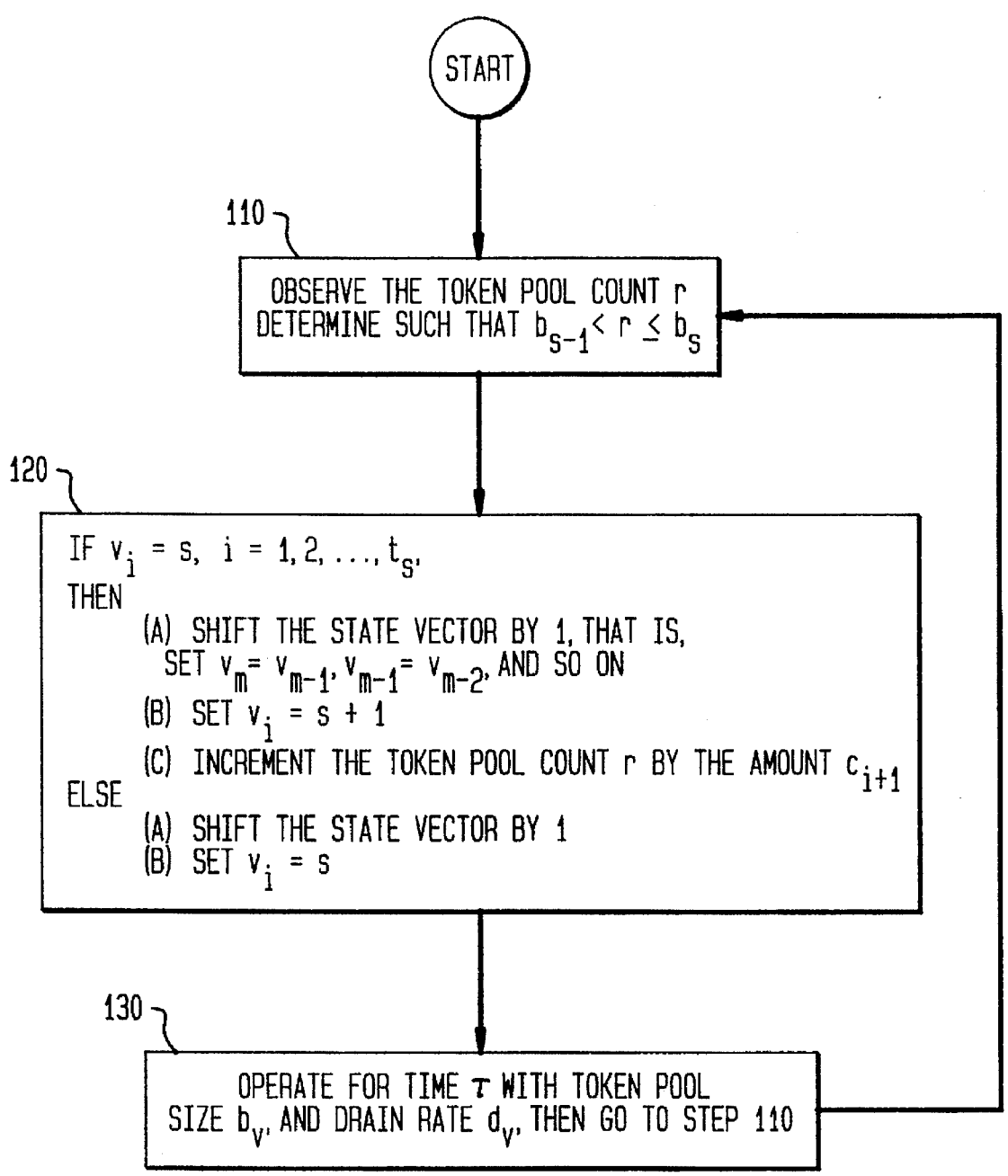
FIG. 3 shows a flow diagram illustrating operation of a leaky bucket in accordance with the present invention.

Referring to FIG. 3, an implementation of the present invention generalized leaky bucket method can be described as follows. As will be understood, $c_i$ denotes the amount by which the token count is to be incremented whenever the state of the generalized leaky bucket 30 is stepped up to i. The increments can also be negative, in which case the token count is decremented, or zero.

In step 110 of the present invention method as shown in FIG. 3, the token pool count r is observed and the state of the token pool s is determined such that the token pool count is less than or equal to the token pool size of the current token pool state and greater than the token pool size of the previous state, i.e., $b_{s-1} < r \leq b_s$.

In a next step 120, if the state vector $v_i=s$, wherein s is the current state of the token pool, and i=1,2, ..., $t_s$ (one of the trigger conditions), then the state vector is shifted by 1, that is, set $v_m=v_{m-1}$, $v_{m-1}=v_{m-2}$, and so on. At this time, the next value of the state vector is also set equal to the next increasing state of the token pool, i.e., set $v_1=s+1$. In addition, the token pool count r is then incremented by the amount $c_{i+1}$. If one of the trigger conditions is not present at the parameter selector, then the state vector is still shifted by 1, however, the value of the next state vector remains set at the current state of the token pool.

In step 130, the generalized leaky bucket is then operated for time $\tau$ with token pool size $b_{v1}$ and drain rate $d_{v1}$, i.e., the active parameters of state $v_1$. After the time $\tau$ has elapsed, the process then reverts back to step 100. The above method as shown in FIG. 3 can generally be described in the form of an algorithm as follows:

Step 100: Observe the token pool count r. Determine s such the that $b_{s-1} < r \leq b_s$.

Step 110: If $v_i=s$, i=1,2, ..., $t_s$,
then
(a) shift the state vector by 1, that is, set $v_m=v_{m-1}$, $v_{m-1}=v_{m-2}$, and so on,
(b) set $v_1=s+1$.
(c) increment the token pool count r by the amount $c_{i+1}$.
else
(a) shift the state vector by 1.
(b) set $v_1=s$.

Step 130: Operate for time $\tau$ with token pool size $b_{v1}$ and drain rate $d_{v1}$, then go to step 110.

From the above description of the present invention method in FIG. 3, it is clear that the generalized leaky bucket is essentially as simple to implement as the traditional leaky bucket. The generalized leaky bucket includes one token counter as in FIG. 1, however, a new measurement interval $\tau$ has been introduced. The active token pool size and drain rate parameters from the parameter sets 34 corresponding to the state of the generalized leaky bucket, are evaluated by simple calculations of the parameter selector 32 every $\tau$ time units.

Since $\tau$ will typically be much larger than $d^{-1}$, the new calculations do not introduce a computational burden. A new timer can be used for $\tau$, however, as would be understood, if $\tau$ is an integral multiple of $d^{-1}$, then the timer used to increment the number of tokens every $d^{-1}$ time units can also be used for state changes. This would then require an additional counter which signals the time to change the state when it reaches the value $\tau d$. The remaining features of the leaky bucket do not change. That is, cells are allowed in if tokens are available and discarded otherwise. The generalized leaky bucket of the present invention is compatible with all the enhancements proposed for a traditional leaky bucket, such as a shaping buffer, tagging of cells, etc.

In an effort to more clearly understand the advantages of the present invention generalized leaky bucket, an illustration of the generalized leaky bucket is presented for the exemplary traffic flow previously discussed. In this case, the generalized leaky bucket is developed with values n=2 and m=3 and the following parameter values: $b_1=200$, $b_2=400$, $t_1=3$, $\tau=1$, $c_1=0$, and $c_2=200$. From the given parameters, it can be seen the instant generalized leaky bucket will step up to a token pool size of 400 after 3 time units and also increase the token pool count by 200 at that time. The generalized leaky bucket stays at the token pool size 400 until the token pool count drops below 200. Thus, every fourth burst can be up to 400 cells while the other three bursts are no larger than 200 cells. A typical evolution of the above-presented generalized leaky bucket is shown in Table I.

TABLE 1

Evolution of the state of the GLB for exemplary usage pattern.

| Time | Observed Count r | Token Pool State s | GLB State $v_1$ | State Vector (After Shift) |
|---|---|---|---|---|
| 1 | 60 | 1 | 1 | (1, ., .) |
| 2 | 80 | 1 | 1 | (1, 1, .) |
| 3 | 180 | 1 | 1 | (1, 1, 1) |
| 4 | 160 | 1 | 2 | (2, 1, 1) |
| 5 | 340 | 2 | 2 | (2, 2, 1) |
| 6 | 170 | 1 | 1 | (1, 2, 2) |
| 7 | 190 | 1 | 1 | (1, 1, 2) |
| 8 | 180 | 1 | 1 | (1, 1, 1) |
| 9 | 180 | 1 | 2 | (2, 1, 1) |

While one is free to choose any value for $\tau$, it must be emphasized that $\tau$ and the drain rates must be set appropriately for the generalized leaky bucket to be most effective. The performance of the generalized leaky bucket and rules for appropriately setting its parameters, as would be understood, are dependent upon the specific communications network in which the device will be used.

In an alternate preferred embodiment of the present invention, a simple enhancement to the generalized leaky bucket is to replace $\tau$ by $\tau_{v1}$, for example, in step 3 of FIG. 3. This makes the state evaluation time of the generalized leaky bucket state-dependent, thereby adding an additional dimension to the instant invention. As would be understood, state changes to smaller token pool sizes can also be delayed by trigger conditions. In addition, the token count can be incremented (or decremented) when the state goes down or remains the same. Token increments every $d^{-1}$ time units can be used to eliminate the need for incrementing tokens every $\tau$ time units. The present invention thus leads to new ways of characterizing and policing traffic.

From the above, it should be understood that the embodiments described, in regard to the drawings, are merely exemplary and that a person skilled in the art may make variations and modifications to the shown embodiments without departing from the spirit and scope of the invention. For example, the present invention will also work equally well with a packet network. All such variations and modifications are intended to be included within the scope of the invention as defined in the appended claims.

What is claimed is:

1. A leaky bucket apparatus for monitoring the transmission of cells at a node within a communications network, said apparatus comprising:

token counter for tracking the number of tokens presently available at said leaky bucket apparatus;

controller for controlling access of said cells to said leaky bucket apparatus, wherein a cell is accepted into said leaky bucket for transmission as long as corresponding ones of said tokens are available in said token counter; and parameter selector for selecting an active parameter set from a group of multiple parameter sets, said group of multiple parameter sets including varying drain rates and token pools sizes to accommodate varying bursts of cells entering said controller, wherein a single one of said parameter sets includes at least a drain rate and token pool size parameter, said parameter selector operable to alter said active parameter set in accordance with predefined trigger conditions input thereto.

2. The apparatus of claim 1, further including a token regenerator for replenishing said tokens in said token counter at prespecified intervals.

3. The apparatus of claim 1, wherein said parameter selector is operable to select an active parameter set according to a predetermined time interval $\tau$.

4. The apparatus of claim 1, wherein said parameter selector includes n different parameter sets, and $d_i$ and $b_i$ denote the i-th drain rate and i-th token pool size, respectively, of said n parameter sets, wherein said token pool size is increasing in i.

5. The apparatus of claim 1, further including n parameter sets, where $c_i$ an i-th token increment, wherein the token count is incremented by $c_i$, whenever a parameter set $d_i$ and $b_i$ is selected.

6. The apparatus of claim 4, wherein said drain rate is nonincreasing in i.

7. The apparatus of claim 3, wherein said controller includes a state vector $v=(v_1, v_2, \ldots, v_m)$ for storing the last m states of said leaky bucket apparatus, wherein said state vector is updated at said predetermined time interval $\tau$ of active parameter set selection.

8. The apparatus of claim 2, wherein said prespecified interval for replenishing said token counter is $d^{-1}$ wherein d corresponds to a current drain rate of said leaky bucket apparatus.

9. The apparatus of claim 1, wherein said cells are ATM cells in an ATM communications network.

10. The apparatus of claim 1, wherein said cells are packets in a packet-based communication network.

11. The apparatus of claim 3, wherein said predefined trigger conditions exist as a multiple of said predetermined time interval $\tau$.

12. The apparatus of claim 3, wherein said predetermined time interval $\tau$ is an integral multiple of $d^{-1}$, where d correspond to a drain rate of said leaky bucket apparatus.

13. The apparatus of claim 12, further including an additional counter which signals a time to change the state of said leaky bucket apparatus when it reaches a value $\tau d$.

14. The apparatus of claim 7, wherein said predetermined time interval $\tau$ is $\tau_{v1}$, thereby providing a state-dependent state evaluation time of the generalized leaky bucket.

15. The apparatus of claim 1, wherein state changes to smaller token pool sizes are delayed by said trigger conditions.

16. A method for monitoring the transmission of cells in a communications network using a leaky bucket mechanism, said leaky bucket mechanism including multiple parameter sets having varying drain rates and token pools sizes to accommodate varying bursts of said cell packets entering said leaky bucket, wherein a single one of said parameter sets includes at least a drain rate and token pool size parameter, said method comprising the steps of:

observing a token pool count in said leaky bucket mechanism to thereby determine the state of a token pool therein;

determining whether a trigger condition exists at a parameter selection means of said leaky bucket;

selecting a new set of active parameters from said set of parameter sets if said trigger condition exists, wherein said state of said token pool is altered in accordance with said trigger condition;

maintaining the existing set of active parameters if said trigger condition does not exist; and operating said leaky bucket mechanism with a token pool size and drain rate corresponding to the current active parameters for a predetermined time interval $\tau$, wherein a cell packet is accepted into said leaky bucket for transmission as long as tokens are available in said token count, said step of observing being repeated at the end of said time interval $\tau$.

17. The method of claim 16, further including the step of replenishing said tokens in said token count at prespecified intervals.

18. The method of claim 16, wherein said cell packets are ATM cells in an ATM communications network.

19. The method of claim 16, wherein said parameter selection means includes n different parameter sets, and $d_i$ and $b_i$ denote the i-th drain rate and i-th token pool size, respectively, of said n parameter sets, wherein said token pool size is increasing in i.

20. The method of claim 16, further including n parameter sets, where $c_i$ an i-th token increment, wherein the token count is incremented by $c_i$, whenever a parameter set $d_i$ and $b_i$ is selected.

21. The method of claim 19, wherein said drain rate is nonincreasing in i.

22. The method of claim 16, wherein said trigger conditions exist as a multiples of said predetermined time interval $\tau$.

23. The method of claim 16, wherein said predetermined time interval $\tau$ is an integral multiple of $d^{-1}$, where d correspond to a drain rate of said leaky bucket apparatus.

* * * * *